US006656607B1

(12) United States Patent
Rouquier et al.

(10) Patent No.: US 6,656,607 B1
(45) Date of Patent: Dec. 2, 2003

(54) METHOD FOR ANTICORROSIVE COATING AND TREATMENT OF METAL PARTS

(75) Inventors: Daniel Rouquier, Liancourt (FR); Benoît Millet, Saint-Witz (FR)

(73) Assignee: Dacral, Creil (FR)

( * ) Notice: Subject to any disclaimer, the term of this patent is extended or adjusted under 35 U.S.C. 154(b) by 0 days.

(21) Appl. No.: 10/089,368

(22) PCT Filed: Sep. 29, 2000

(86) PCT No.: PCT/FR00/02701
§ 371 (c)(1),
(2), (4) Date: Mar. 28, 2002

(87) PCT Pub. No.: WO01/23639
PCT Pub. Date: Apr. 5, 2001

(30) Foreign Application Priority Data

Sep. 30, 1999 (FR) .............................. 99 12228

(51) Int. Cl.$^7$ .............................. B05D 3/10; B05D 7/14
(52) U.S. Cl. ...................... 428/659; 428/433; 428/702; 106/14.13; 106/14.41; 427/406; 427/419.1; 148/251
(58) Field of Search ............................. 148/251; 428/432, 428/433, 702, 626, 659, 553, 447; 106/14.13, 14.41; 427/11, 404, 405, 406, 419.1, 427, 301, 328

(56) References Cited

U.S. PATENT DOCUMENTS 4,011,088 A * 3/1977 Makishima et al. ........ 106/1.17
4,243,430 A * 1/1981 Sperry et al. ................ 524/432
4,407,899 A    10/1983 Hara et al.
4,655,832 A * 4/1987 Omori et al. ............... 106/1.18
5,001,173 A * 3/1991 Anderson et al. ........... 523/406

FOREIGN PATENT DOCUMENTS

| EP | 177786 A1 | 4/1986 | |
| EP | 0 808 883 A2 * | 11/1997 | ......... C09D/183/04 |
| JP | 57145985 | 9/1982 | |
| JP | 63250472 | 10/1988 | |
| JP | 03184770 | 8/1991 | |
| JP | 04-22624 * | 1/1992 | ............ B05D/3/10 |
| WO | WO 95/21277 * | 8/1995 | ............ C23C/22/05 |

* cited by examiner

Primary Examiner—Deborah Jones
Assistant Examiner—Vivek Koppiltar
(74) Attorney, Agent, or Firm—Wood, Phillips, Katz, Clark & Mortimer

(57) ABSTRACT

The invention concerns a method for producing an anticorrosive coating for metal parts, free of chromium and chromium-based derivatives and in particular hexavalent chromium, preferably to be applied in thin layers while providing highly efficient protection. Said coating consists of the synergistic association of a first metal zinc layer and one or several coating layers obtained by using an aqueous composition containing a particulate metal, an appropriate solvent, a thickening agent and a binder consisting of a silane.

26 Claims, 1 Drawing Sheet

METHOD FOR ANTICORROSIVE COATING AND TREATMENT OF METAL PARTS

The present invention aims to develop an anticorrosion coating for metal workpieces, free of chromium and chromium-based derivatives, and in particular of hexavalent chromium, which can preferably be applied in thin layers while at the same time providing highly effective protection.

The invention applies to workpieces of a metallic nature (in particular steel, cast iron) which require good resistance to corrosion, with a thin layer. The geometry of the workpieces has little importance as long as they remain suitable for application using the processes described.

The invention makes it possible to improve the anticorrosion properties of the workpieces treated without using chromium, and in particular hexavalent chromium, in the formulation of the coatings.

Many chromium-based anticorrosion treatment solutions will have been proposed to date. While they are generally satisfactory in terms of protecting the metal workpieces, they are, however, increasingly criticized due to their consequences in terms of toxicity, and in particular due to the harmful consequences to the environment.

The present invention relates to an anticorrosion coating for metal workpieces, characterized in that it consists of the synergistic combination of a first layer based on metallic zinc and one or more coating layer(s) obtained using an aqueous composition containing a particulate metal, a suitable solvent, a thickener and a binder consisting of a silane.

The first layer based on metallic zinc may, for example, advantageously be produced by mechanical deposition. Such a layer, consisting of zinc or more generally of a zinc and iron alloy, or even of a mixture of particles of zinc and of iron, may be applied in the context of the present invention in an amount of between 50 and 300 mg/dm$^2$ of coating metal. For some particular applications, it may even be possible to use smaller deposited amounts.

Advantageously, the layer based on metallic zinc is mechanically deposited by a shotblasting operation with the aid of steel shot having at least one outer layer comprising either pure zinc or a zinc-based alloy.

Such mechanical deposition of a layer based on metallic zinc may also be carried out by a shotblasting operation with the aid of a mixture of steel shot and shot consisting of a steel core and having, on the surface, at least one outer layer based on a zinc alloy or an outer layer of pure zinc.

Finally, this mechanical deposition of the layer based on metallic zinc may also be obtained by shotblasting with the aid of shot based essentially on an iron alloy, the blasting being performed in the presence of a zinc powder or zinc granules, which is therefore applied due to the mechanical effect of the blasting.

The term "shot" or "microshot" used in the context of the present invention to describe the shotblasting operations should be understood in the broad sense, i.e. understood to encompass all types of shapes of particles or microparticles to be blasted on to the surface of the workpieces.

BRIEF DESCRIPTION OF THE DRAWINGS

The shotblasting machine used to form this first layer based on zinc may, for example, be constructed in accordance with the schematic diagram illustrated in the appended FIG. 1.

This figure shows that the machine comprises mainly a shotblasting chamber 10 which may, for example, have two blasting turbines 12 between which the workpieces to be treated run. The blasting turbines 12 therefore blast the microshot, made of iron alloy or zinc-based alloy, on to the surfaces of the workpieces to be treated, where appropriate in the presence of a zinc powder or granules. The lower part of this shotblasting chamber 10 is equipped with a device 14 for recycling the blasting shot. Next, this shot is taken to a particle-size separator 16 so as to separate shot particles which have become too small in diameter. Thus, metal dust 18 generated by the blasting operation is in particular removed. If only shot coated with a zinc-based alloy is used, after shot particle-size sorting the shot is taken to a magnetic separator 20 which makes it possible to sort between steel shot covered with a zinc-based alloy and steel shot depleted of zinc, i.e. shot which has lost most of this zinc-based alloy; the zinc-depleted steel shot is recovered in the station 22. After this magnetic separator 20, a device 24 for measuring the zinc content of the blasting shot is also provided.

Figure 1:
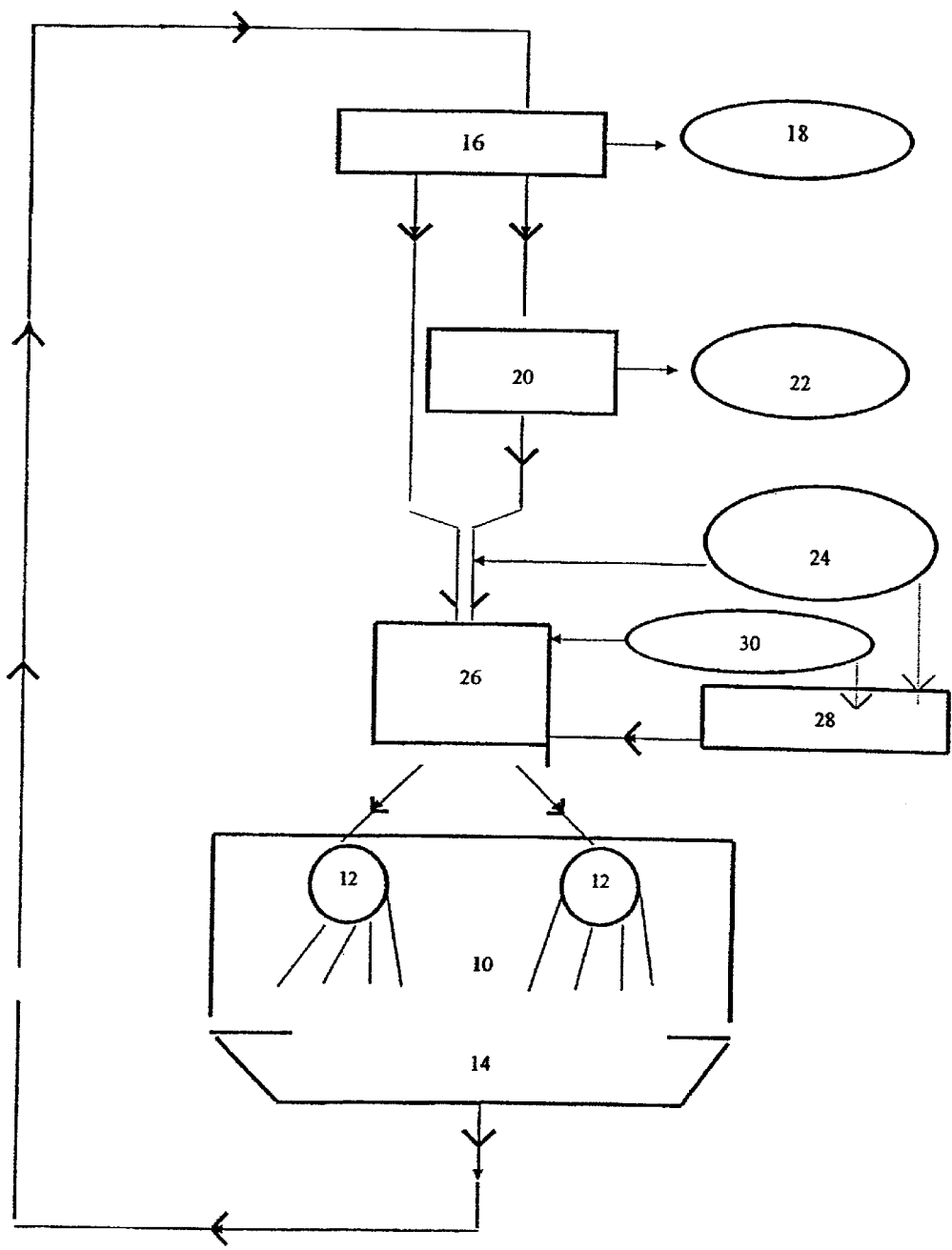

Depending on the zinc content measurement, the tank 26 of microshot, which is intended to feed the blasting turbines 12 of the shotblasting device 10, may or may not be replenished with fresh shot at 28, i.e. shot which is charged or recharged with zinc. Advantageously, the tank 26 is also equipped with a level control system 30.

It is therefore possible in this way for the layer based on metallic zinc to be mechanically deposited, in a continuous or discontinuous manner, on the surface of the workpieces to be treated. Another way of producing a metallic deposit of zinc or zinc alloy is electrogalvanizing.

Electrogalvanizing is the metallic deposition of zinc or a zinc-based alloy from an aqueous solution by setting up a direct electric current between the workpiece to be coated and an anode. This anode may be either inert, or consist of zinc itself in the form of a ball or plate with a purity of 99.99%. The electrolysis bath may be either acid or alkali with or without cyanide. The electrolysis bath may also contain salts of other metals, thus making it possible to form alloys with the zinc (nickel, manganese, iron, cobalt).

Another way to deposit zinc or a zinc-based alloy is hot-dip galvanizing. Hot-dip galvanizing is an operation consisting of coating by dipping in a bath of molten zinc at a temperature of about 460° C.

Before the actual galvanizing operation, a fluxing operation should be carried out, intended to complete the preparation of the surface, by dissolving the oxides reformed at the surface during the rinses, avoiding the oxidation of the workpieces with a film of flux and ensuring good wettability of the surface with the molten zinc. The fluxes used consist of zinc chloride and ammonium chloride.

The second step is the actual galvanizing. In general, the zinc content of the bath is 99.5%. The conventional temperature range is between 445 and 460° C. The rate of immersion of the workpieces in the bath will regulate the thickness of the layer of zinc.

With regard to the subsequent application of one or more coating layer(s) obtained based on an aqueous solution containing a particulate metal, a solvent, a thickener and a binder consisting of a silane, such a composition more precisely comprises, for example:

a particulate metal chosen from zinc and/or aluminum,
an organic solvent,
a thickener,
a silane-based binder carrying epoxy functional groups,
water.

According to another characteristic of the invention, said composition contains from 10 to 35% by weight of zinc and/or from 1.5 to 35% by weight of aluminum.

According to an advantageous characteristic, said composition contains from 3 to 20% by weight of silane.

Very generally, the silane-based derivative used as the binder, advantageously gamma-glycidoxypropyltrimethoxysilane, for example, is present in the composition in an amount of between approximately 5 and approximately 12% by weight relative to the total weight of the composition.

According to another particularity of the invention, said composition contains from 1 to 30% by weight of an organic solvent, in particular of dipropylene glycol.

More generally, the organic solvent used in said aqueous composition is a liquid solvent with a high boiling point, for example an oxohydroxylated liquid, advantageously chosen from the group consisting of tri- and tetraethylene glycol, di- and tripropylene glycol, monomethyl, dimethyl and ethyl ethers of the abovementioned glycols, polypropylene glycols, diacetone alcohol, ethers of diethylene glycol and mixtures thereof.

Said composition also preferably contains from 0.005 to 2% by weight of a thickener, in particular of hydroxypropylmethylcellulose.

Advantageously, the particulate metal is used in the form of powder having a diameter of between 1 and 10 $\mu$m, preferably 2–5 $\mu$m, or of particles which are small in size, less than 15 microns, or a mixture of both.

In general, the particulate metal may consist of one or two of the metals chosen from zinc and aluminum, alloys thereof and intermetallic mixtures thereof in any proportions.

Said aqueous composition also contains a thickener, preferably present at 0.05 to approximately 2% by weight relative to the total weight of the composition. Said thickener will preferably be chosen from the group comprising cellulose thickeners, xanthan gum, modified clays and mixtures thereof.

According to an advantageous embodiment of said aqueous composition, the latter will contain from approximately 0.2 to approximately 1.2% by weight of the thickener, preferably chosen from the group comprising hydroxyethylcellulose, methylcellulose, methylhydroxypropylcellulose, ethylhydroxyethylcellulose, methylethylcellulose, and mixtures thereof.

Said aqueous composition also advantageously contains a wetting agent, preferably present at 0.01 to approximately 3% by weight relative to the total weight of the composition, said wetting agent preferably being an agent of the nonionic type.

The aqueous composition may also, under certain conditions, contain from approximately 0.1 to approximately 10% by weight of a boron-based compound, for example chosen from orthoboric acid, metaboric acid, tetraboric acid, boron oxide and mixtures thereof.

Finally, said composition may also contain from approximately 0.1 to approximately 2% by weight of a corrosion inhibitor chosen from the group comprising calcium nitrate, dibasic ammonium phosphate, calcium sulfonate, lithium carbonate and mixtures thereof.

It will finally be specified that, in general, said composition contains from approximately 30 to approximately 60% by weight of water relative to the total weight of the composition.

This composition may be applied on to the first layer based on metallic zinc by spraying operations, by dipping or by dip-spinning, and then subjected to a baking operation, preferably at a temperature of 70 to 300° C.

Advantageously, said coating layer(s) is (are) produced so as to obtain about 10 to 20 g/m$^2$ expressed by weight of dry material.

In order to demonstrate the synergistic nature of the combination of the first layer based on metallic zinc with the coating layer(s) over this obtained using the silane-based aqueous composition, the conditions under which the various layers were applied will be specified below in the context of the comparative experiment, the results of which will be reported below.

In the case in point, the mechanical deposition of the layer based on metallic zinc by blasting was performed by mechanical dry blasting on to a DC04 steel sheet using a blasting machine with the name of Z-coater DZ-100 marketed by the Japanese company SAMPOH, the function of which corresponds to that of the scheme of the appended figure. The blasting conditions are as follows:

| blasting rate: | 80 kg per minute, |
|---|---|
| turbine speed: | 4200 rpm. |

The particles used are particles of zinc-iron alloy:

ZZ48: 70%, size of the particles 0.25 to 0.7 mm
ZZ60: 30%, size of the particles 0.04 to 0.25 mm.

The particles consist of an iron core covered with a zinc film with, at the interface, a layer of zinc-iron alloy.

The zinc contents for the ZZ48 and ZZ60 particles are, respectively, 33–39% and 67–73%.

The silane-based aqueous composition used in the context of the comparative experiment corresponds to:

| zinc: | 28%, |
|---|---|
| aluminum: | 3.1%, |
| dipropylene glycol: | 4.2%, |
| glycidoxypropyltrimethoxysilane: | 7% |
| nonylphenolpolyoxyethylene: | 3%, and |
| hydroxypropylmethylcellulose: | 0.13%. |

This silane-based aqueous composition was applied with a round-jet (0.8 mm) spray gun. The spraying time was 4 seconds to obtain a layer weight of about 16–18 g/m$^2$ with a product having 40% of solids and viscosity 38 seconds (AFNOR [French Standards Institute] No. 4).

The workpieces are baked by convection: drying at 70° C. for 20 minutes followed by baking at 300° C. for 30 minutes.

The results of these comparative experiments are given in the three tables below:

TABLE 1

Shotblasting with the aid of zinc-based shot + silane treatment:

| Total grammage | System | SF* in hours |
|---|---|---|
| 10 g/m$^2$ | Zinc blasting | 15 |
| | Silane treatment | 48 |
| 20 g/m$^2$ | Zinc blasting | 30 |
| | Silane treatment | 96 |
| | Blasting 10 g/m$^2$ + silane treatment 10 g/m$^2$ | 216 |
| 30 g/m$^2$ | Zinc blasting | 72 |
| | Silane treatment | 192 |
| | Blasting 10 g/m$^2$ + silane treatment 20 g/m$^2$ | 432 |

*SF: Salt fog according to the ASTM B117 test

TABLE 2

Electrogalvanized + silane treatment system:

| Total grammage | System | SF* in hours |
|---|---|---|
| 10 g/m² | Silane treatment | 48 |
| 20 g/m² | Silane treatment | 96 |
| 70 g/m² | Electrogalvanized | 96 |
| 80 g/m² | Electrogalvanized | 120 |
|  | Electrogalvanized 70 g/m² + silane treatment 10 g/m² | 360 |
| 90 g/m² | Electrogalvanized | 144 |
|  | Electrogalvanized 70 g/m² + silane treatment 20 g/m² | >1000 h |

*SF: Salt fog according to the ASTM B117 test

TABLE 3

Galvanized + silane treatment system:

| Total grammage | System | SF* in hours |
|---|---|---|
| 10 g/m² | Silane treatment | 48 |
| 20 g/m² | Silane treatment | 96 |
| 90 g/m² | Galvanized | 168 |
| 100 g/m² | Galvanized | 192 |
|  | Galvanized 90 g/m² + silane treatment 10 g/m² | 384 |
| 110 g/m² | Galvanized | 216 |
|  | Galvanized 90 g/m² + silane treatment 20 g/m² | >1000 h |

*SF: Salt fog according to the ASTM B117 test

Whatever the method used for depositing the first layer based on metallic zinc, combined with depositing the coating using the silane-based aqueous composition, the synergistic effect is unquestionably demonstrated in the three tables, this being, of course, for the various total grammage variants tried in the experiment.

The salt fog resistance is very clearly improved for systems based on electrogalvanizing and galvanizing and, to a lesser degree, on blasting, when the silane treatment reaches a grammage of 20 g/m². This may be explained by the fact that a grammage of 10 g/m² is probably insufficient to completely cover the workpiece given the surface heterogeneities.

In order to obtain about 400 hours of salt fog, it is possible to use the system of blasting+silane treatment at 30 g/m² of total grammage (i.e. 6–7 μm); for the system of electrogalvanizing+silane treatment at 80 g/m² of total grammage (i.e. 11–13 μm); or for the system of galvanizing+silane treatment at 100 g/m² of total grammage (i.e. 14–16 μm).

This shows the strong synergy which exists between the zinc blasting and the silane treatment and makes it possible to halve the thickness deposited for a similar resistance to corrosion.

What is claimed is:

1. A metal workpiece having a anticorrosion coating, characterized in that a metallic zinc layer is interposed between the metal workpiece and the coating and in that the coating comprises a synergistic combination of the metallic zinc layer, which is produced by mechanical deposition, and one or more layers obtained by using an aqueous composition containing a particulate metal, a solvent, and a binder consisting of silane.

2. The metal workpiece as claimed in claim 1, characterized in that the mechanical deposition of the metallic zinc layer is carried out by shotblasting with the aid of shot having at least one outer layer comprising a zinc-based alloy.

3. The metal workpiece as claimed in claim 1, characterized in that the mechanical deposition of the metallic zinc layer is carried out by shotblasting with the aid of a mixture of shot consisting of an iron-based alloy and shot having at least one outer layer comprising a zinc-based alloy.

4. The metal workpiece as claimed in claim 1, characterized in that the mechanical deposition of the metallic zinc layer is carried out by shotblasting with the aid of shot based on an iron alloy in the presence of zinc powder.

5. The metal composition as claimed in claim 1, characterized in that the mechanical deposition of the metallic zinc layer is carried out with the aid of particles of zinc, a mixture of particles of zinc and of particles of iron, or particles of zinc-iron alloys, at 50 to 300 mg/dm².

6. The metal workpiece as claimed in claim 1, characterized in that the one or more coating layers are obtained using the aqueous composition, which comprises
   (a) a particulate metal chosen from zinc and/or aluminum,
   (b) an organic solvent,
   (c) a silane-based binder carrying epoxy functional groups, and
   (d) water.

7. The metal workpiece as claimed in claim 6, characterized in that the composition contains from 10 to 35% by weight of zinc.

8. The metal workpiece as claimed in claim 6, characterized in that the composition contains from 1.5 to 35% by weight of aluminum.

9. The metal workpiece as claimed in claim 6, characterized in that the composition contains from 3 to 20% by weight of silane.

10. The metal workpiece as claimed in claim 6, characterized in that the composition contains from 1 to 30% by weight of the organic solvent, which consists of dipropylene glycol.

11. The metal workpiece as claimed in claim 6, characterized in that the composition contains from 0.005 to 2% by weight of thickener consisting of, hydroxypropylmethylcellulose.

12. The metal workpiece as claimed in claim 1, characterized in that the one or more coating layers are applied by spraying, dipping or dip-spinning, and then subjected to a baking operation, at a temperature of 70 to 300° C.

13. The metal workpiece as claimed in claim 12, characterized in that the one or more coating layers are produced so as to obtain about 10 to 20 g/m² expressed by weight of dry material.

14. A process of providing a metal workpiece with an anticorrosion coating, the process comprising steps of
   (a) mechanically depositing a metallic zinc layer on the metal workpiece and
   (b) coating the metallic zinc layer with one or more layers of an aqueous composition containing a particulate metal, a solvent, and a binder consisting of silane,
wherein the workpiece is coated with a synergistic combination of the metallic zinc layer and the one or more coating layers.

15. The process of claim 14, wherein step (a) is carried out by shotblasting with the aid of shot having at least one outer layer comprising a zinc-based alloy.

16. The process of claim 14, wherein step (a) is carried out by shotblasting with the aid of a mixture of shot consisting of an iron-based alloy and shot having at least one outer layer comprising a zinc-based alloy.

17. The process of claim 14, wherein step (a) is carried out by shotblasting with the aid of shot based on an iron alloy in the presence of zinc powder.

18. The process of claim 14, wherein step (a) is carried out by shotblasting with the aid of particles of zinc, a mixture of particles of zinc and of particles of iron, or particles of zinc-iron alloys, at 50 to 300 mg/dm$^2$.

19. The process of claim 14, wherein the aqueous composition comprises
   (a) a particulate metal chosen from zinc and/or aluminum,
   (b) an organic solvent,
   (c) a silane-based binder carrying epoxy functional groups, and
   (d) water.

20. The process of claim 19, wherein the composition contains from 10 to 35% by weight of zinc.

21. The process of claim 19, wherein the composition contains from 1.5 to 35% by weight of aluminum.

22. The process of claim 19, wherein the composition contains from 3 to 20% by weight of silane.

23. The process of claim 19, wherein the composition contains from 1 to 30% by weight of the organic solvent, which consisting of dipropylene glycol.

24. The process of claim 19, wherein the composition contains from 0.005 to 2% by weight of a thickener consisting of hydroxypropylmethylcellulose.

25. The process of claim 14, wherein the one or more coating layers are applied by spraying, dipping or dip-spinning, and then subjected to a baking operation, at a temperature of 70 to 300° C.

26. The process of claim 25, wherein the one or more coating layers are produced so as to obtain about 10 to 20 g/m$^2$ expressed by weight of dry material.

* * * * *